United States Patent
Cho et al.

(10) Patent No.: US 10,586,976 B2
(45) Date of Patent: Mar. 10, 2020

(54) NEGATIVE ELECTRODE ACTIVE MATERIAL AND LITHIUM SECONDARY BATTERY COMPRISING SAME

(71) Applicant: Nexeon Ltd, Oxfordshire (GB)

(72) Inventors: Young Tai Cho, Seoul (KR); Seung Chul Park, Daejeon (KR); Seon Park, Daejeon (KR); Hee Young Seo, Daejeon (KR); Jee Hye Park, Daejeon (KR); Yong Eui Lee, Gyeonggi-do (KR); Chul Hwan Kim, Daejeon (KR)

(73) Assignee: Nexeon Ltd, Oxfordshire (GB)

( * ) Notice: Subject to any disclaimer, the term of this patent is extended or adjusted under 35 U.S.C. 154(b) by 0 days.

(21) Appl. No.: 15/305,763

(22) PCT Filed: Apr. 22, 2015

(86) PCT No.: PCT/KR2015/004029
§ 371 (c)(1),
(2) Date: Oct. 21, 2016

(87) PCT Pub. No.: WO2015/163695
PCT Pub. Date: Oct. 29, 2015

(65) Prior Publication Data
US 2017/0047580 A1    Feb. 16, 2017

(30) Foreign Application Priority Data
Apr. 22, 2014    (KR) .................. 10-2014-0048385

(51) Int. Cl.
*H01M 4/134*    (2010.01)
*H01M 4/38*    (2006.01)
(Continued)

(52) U.S. Cl.
CPC ............ *H01M 4/134* (2013.01); *H01M 4/366* (2013.01); *H01M 4/38* (2013.01); *H01M 4/386* (2013.01);
(Continued)

(58) Field of Classification Search
CPC ........... H01M 10/052; H01M 10/0525; H01M 2004/021; H01M 2004/027;
(Continued)

(56) References Cited

U.S. PATENT DOCUMENTS 4,002,541 A    1/1977 Streander
4,192,720 A    3/1980 Bucker et al.
(Continued)

FOREIGN PATENT DOCUMENTS

CN    1569623 A    1/2005
CN    101188281 A    5/2008
(Continued)

OTHER PUBLICATIONS

Liu et al., University of California, Solution to Homework Assignment #1, 2013 (Year: 2013).*
(Continued)

*Primary Examiner* — Robert S Jones
*Assistant Examiner* — Victoria H Lynch
(74) *Attorney, Agent, or Firm* — William R. Haulbrook; Michael D. Schmitt; Coate, Hall & Stewart LLP

(57) ABSTRACT

Provided is a negative active material and a lithium secondary battery including the negative active material. The negative active material for a secondary battery includes silicon particles, wherein circularities of the particles are determined by equation 1 below, and the circularities are 0.5 or greater and 0.9 or less, Circularity=$2(pi \times A)^{1/2}/P$    [Equation 1]

(Continued)

where A denotes a projected area of the silicon particle that is two-dimensionally projected, and P denotes a circumferential length of the silicon particle that is two-dimensionally projected.

15 Claims, 3 Drawing Sheets

(51) Int. Cl.
　　　*H01M 10/052* (2010.01)
　　　*H01M 4/36* (2006.01)
　　　*H01M 10/0525* (2010.01)
　　　*H01M 4/62* (2006.01)
　　　*H01M 4/02* (2006.01)

(52) U.S. Cl.
　　　CPC ..... *H01M 10/052* (2013.01); *H01M 10/0525* (2013.01); *H01M 4/625* (2013.01); *H01M 4/626* (2013.01); *H01M 2004/021* (2013.01); *H01M 2004/027* (2013.01); *H01M 2220/10* (2013.01); *H01M 2220/20* (2013.01); *H01M 2220/30* (2013.01)

(58) Field of Classification Search
　　　CPC ......... H01M 2220/10; H01M 2220/20; H01M 2220/30; H01M 4/13; H01M 4/366; H01M 4/38; H01M 4/386; H01M 4/625; H01M 4/626
　　　See application file for complete search history.

(56) References Cited

U.S. PATENT DOCUMENTS

| | | |
|---|---|---|
| 4,363,708 A | 12/1982 | Rauchle et al. |
| 4,686,013 A | 8/1987 | Pensabene et al. |
| 5,395,711 A | 3/1995 | Tahara et al. |
| 5,514,495 A | 5/1996 | Klaus |
| 5,658,691 A | 8/1997 | Suzuki et al. |
| 5,914,183 A | 6/1999 | Canham |
| 6,132,724 A | 10/2000 | Blum |
| 6,190,951 B1 | 2/2001 | Nakahori et al. |
| 6,300,013 B1 | 10/2001 | Yamada et al. |
| 6,334,939 B1 | 1/2002 | Zhou et al. |
| 6,514,395 B2 | 2/2003 | Zhou et al. |
| 7,138,208 B2 | 11/2006 | Tanjo et al. |
| 7,244,513 B2 | 7/2007 | Li et al. |
| 7,311,999 B2 | 12/2007 | Kawase et al. |
| 7,332,339 B2 | 2/2008 | Canham |
| 7,402,829 B2 | 7/2008 | Green |
| 7,479,351 B2 | 1/2009 | Matsubara et al. |
| 7,615,206 B2 | 11/2009 | Sandhage et al. |
| 7,638,239 B2 | 12/2009 | Sato et al. |
| 7,713,849 B2 | 5/2010 | Habib et al. |
| 7,824,801 B2 | 11/2010 | Kogetsu et al. |
| 7,851,086 B2 | 12/2010 | Matsubara et al. |
| 7,879,734 B2 | 2/2011 | Fukutani et al. |
| 8,080,337 B2 | 12/2011 | Higuchi et al. |
| 8,526,166 B2 | 9/2013 | Choi et al. |
| 8,585,918 B2 | 11/2013 | Green et al. |
| 8,597,831 B2 | 12/2013 | Green et al. |
| 8,772,174 B2 | 7/2014 | Green et al. |
| 8,940,192 B2 | 1/2015 | Toyokawa |
| 8,940,437 B2 | 1/2015 | Green et al. |
| 8,945,431 B2 | 2/2015 | Schulz et al. |
| 9,252,426 B2 | 2/2016 | Green |
| 9,548,489 B2 | 1/2017 | Abdelsalam et al. |
| 10,008,716 B2 | 6/2018 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,164,257 B2 | 12/2018 | Otsuka et al. |
| 2001/0044045 A1 | 11/2001 | Sato et al. |
| 2002/0037433 A1 | 3/2002 | Rasmussen et al. |
| 2002/0074972 A1 | 6/2002 | Narang et al. |
| 2002/0121460 A1 | 9/2002 | Moy et al. |
| 2002/0148727 A1 | 10/2002 | Zhou et al. |
| 2002/0164479 A1 | 11/2002 | Matsubara et al. |
| 2003/0054250 A1 | 3/2003 | Kweon et al. |
| 2003/0099883 A1 | 5/2003 | Ochoa et al. |
| 2003/0150378 A1 | 8/2003 | Winterton et al. |
| 2003/0215711 A1 | 11/2003 | Aramata et al. |
| 2004/0052867 A1 | 3/2004 | Canham |
| 2004/0140222 A1 | 7/2004 | Smedley et al. |
| 2004/0166319 A1 | 8/2004 | Li et al. |
| 2004/0185341 A1 | 9/2004 | Yamamoto et al. |
| 2004/0214085 A1 | 10/2004 | Sheem et al. |
| 2005/0031958 A1 | 2/2005 | Fukuoka et al. |
| 2005/0186378 A1 | 8/2005 | Bhatt |
| 2005/0186474 A1 | 8/2005 | Jiang et al. |
| 2005/0233213 A1 | 10/2005 | Lee et al. |
| 2006/0019151 A1 | 1/2006 | Imachi et al. |
| 2006/0040182 A1 | 2/2006 | Kawakami et al. |
| 2006/0099495 A1 | 5/2006 | Suzuki et al. |
| 2006/0102473 A1 | 5/2006 | Bito et al. |
| 2006/0147802 A1 | 7/2006 | Yasuda et al. |
| 2006/0166098 A1 | 7/2006 | Tabuchi et al. |
| 2006/0216603 A1 | 9/2006 | Choi |
| 2006/0251561 A1 | 11/2006 | Farrell et al. |
| 2007/0011102 A1 | 1/2007 | Matsuhira et al. |
| 2007/0020521 A1 | 1/2007 | Obrovac et al. |
| 2007/0031733 A1 | 2/2007 | Kogetsu et al. |
| 2007/0054190 A1 | 3/2007 | Fukui et al. |
| 2007/0077490 A1 | 4/2007 | Kim et al. |
| 2007/0099081 A1 | 5/2007 | Matsuda et al. |
| 2007/0105017 A1 | 5/2007 | Kawase et al. |
| 2007/0111101 A1 | 5/2007 | Ohkubo et al. |
| 2007/0111102 A1 | 5/2007 | Inoue et al. |
| 2007/0224508 A1 | 9/2007 | Aramata et al. |
| 2007/0255198 A1 | 11/2007 | Leong et al. |
| 2007/0281216 A1 | 12/2007 | Petrat et al. |
| 2008/0038170 A1 | 2/2008 | Sandhage et al. |
| 2008/0062616 A1 | 3/2008 | Matsuda et al. |
| 2008/0090152 A1 | 4/2008 | Kosuzu et al. |
| 2008/0096110 A1 | 4/2008 | Bito et al. |
| 2008/0113269 A1 | 5/2008 | Yamamoto et al. |
| 2008/0124631 A1 | 5/2008 | Fukui et al. |
| 2008/0145757 A1 | 6/2008 | Mah et al. |
| 2008/0166474 A1 | 7/2008 | Deguchi et al. |
| 2008/0261112 A1 | 10/2008 | Nagata et al. |
| 2008/0280207 A1 | 11/2008 | Patoux et al. |
| 2008/0286654 A1 | 11/2008 | Sawa et al. |
| 2008/0305395 A1 | 12/2008 | Hirose et al. |
| 2009/0004566 A1 | 1/2009 | Shirane et al. |
| 2009/0004568 A1 | 1/2009 | Hirose et al. |
| 2009/0010833 A1 | 1/2009 | Rosenband et al. |
| 2009/0137688 A1 | 5/2009 | Yang |
| 2009/0143227 A1 | 6/2009 | Dubrow et al. |
| 2009/0162750 A1 | 6/2009 | Kawakami et al. |
| 2009/0169985 A1 | 7/2009 | Yamaguchi et al. |
| 2009/0186267 A1 | 7/2009 | Tiegs |
| 2009/0239151 A1 | 9/2009 | Nakanishi et al. |
| 2009/0253033 A1 | 10/2009 | Hirose et al. |
| 2009/0301866 A1 | 12/2009 | Zaghib et al. |
| 2010/0008841 A1 | 1/2010 | Rosenkilde |
| 2010/0009261 A1 | 1/2010 | Watanabe |
| 2010/0112442 A1 | 5/2010 | Fujikawa et al. |
| 2010/0112451 A1 | 5/2010 | Shibutani et al. |
| 2010/0112475 A1 | 5/2010 | Natsume et al. |
| 2010/0143773 A1 | 6/2010 | Honbou |
| 2010/0143798 A1 | 6/2010 | Zhamu et al. |
| 2010/0178565 A1 | 7/2010 | Green |
| 2010/0190061 A1 | 7/2010 | Green |
| 2010/0190062 A1 | 7/2010 | Yamamoto et al. |
| 2010/0196760 A1 | 8/2010 | Green |
| 2010/0209328 A1 | 8/2010 | Bi et al. |
| 2010/0243951 A1 | 9/2010 | Watanabe et al. |
| 2010/0266902 A1 | 10/2010 | Takano et al. |
| 2010/0278931 A1 | 11/2010 | Ashton et al. |
| 2010/0285358 A1 | 11/2010 | Cui et al. |
| 2010/0285367 A1 | 11/2010 | Matsui et al. |
| 2010/0291441 A1 | 11/2010 | Ugaji et al. |
| 2010/0297502 A1 | 11/2010 | Zhu et al. |

(56) References Cited

U.S. PATENT DOCUMENTS

| | | |
|---|---|---|
| 2010/0330418 A1 | 12/2010 | Liang et al. |
| 2010/0330425 A1 | 12/2010 | Lopatin et al. |
| 2011/0001097 A1 | 1/2011 | Aramata et al. |
| 2011/0008531 A1 | 1/2011 | Mikhaylik et al. |
| 2011/0027537 A1 | 2/2011 | Inoue et al. |
| 2011/0039690 A1 | 2/2011 | Niu |
| 2011/0056563 A1 | 3/2011 | Bari |
| 2011/0067228 A1 | 3/2011 | Green |
| 2011/0076560 A1 | 3/2011 | Scordilis-Kelley et al. |
| 2011/0085960 A1 | 4/2011 | Mukasyan et al. |
| 2011/0104480 A1 | 5/2011 | Malekos et al. |
| 2011/0111135 A1 | 5/2011 | Kamiyama et al. |
| 2011/0111279 A1 | 5/2011 | Smithyman et al. |
| 2011/0111294 A1 | 5/2011 | Lopez et al. |
| 2011/0123866 A1 | 5/2011 | Pan et al. |
| 2011/0163274 A1 | 7/2011 | Plee et al. |
| 2011/0236493 A1 | 9/2011 | Canham et al. |
| 2011/0244328 A1 | 10/2011 | Iriyama et al. |
| 2011/0250498 A1 | 10/2011 | Green et al. |
| 2011/0256452 A1 | 10/2011 | Cho et al. |
| 2011/0269019 A1 | 11/2011 | Green et al. |
| 2011/0281180 A1 | 11/2011 | Kim et al. |
| 2011/0287317 A1 | 11/2011 | Nakanishi |
| 2011/0287318 A1 | 11/2011 | Loveness et al. |
| 2011/0299223 A1 | 12/2011 | Oh et al. |
| 2011/0311873 A1 | 12/2011 | Schulz et al. |
| 2012/0040242 A1 | 2/2012 | Kurasawa et al. |
| 2012/0094178 A1 | 4/2012 | Loveridge et al. |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0141872 A1 | 6/2012 | Kim et al. |
| 2012/0171566 A1 | 7/2012 | Yoshitake et al. |
| 2012/0202112 A1 | 8/2012 | Yushin et al. |
| 2012/0255858 A1 | 10/2012 | Maeshima et al. |
| 2012/0315543 A1 | 12/2012 | Wata et al. |
| 2013/0004846 A1 | 1/2013 | Kim et al. |
| 2013/0040199 A1 | 2/2013 | Yamamura |
| 2013/0071750 A1 | 3/2013 | Park et al. |
| 2013/0115517 A1 | 5/2013 | Kim et al. |
| 2013/0136986 A1 | 5/2013 | Scoyer et al. |
| 2013/0157127 A1 | 6/2013 | Hirose et al. |
| 2013/0189575 A1 | 7/2013 | Anguchamy et al. |
| 2013/0196158 A1 | 8/2013 | Yoshida et al. |
| 2013/0216907 A1 | 8/2013 | Rayner et al. |
| 2013/0224583 A1 | 8/2013 | Green |
| 2013/0224606 A1 | 8/2013 | Koh et al. |
| 2013/0266865 A1 | 10/2013 | Kwon et al. |
| 2013/0337314 A1 | 12/2013 | Essaki et al. |
| 2014/0021415 A1 | 1/2014 | Kang et al. |
| 2014/0023928 A1 | 1/2014 | Jeon et al. |
| 2014/0030599 A1 | 1/2014 | Lee et al. |
| 2014/0050987 A1 | 2/2014 | Park et al. |
| 2014/0087268 A1 | 3/2014 | Kim et al. |
| 2014/0106230 A1 | 4/2014 | Kim et al. |
| 2014/0147751 A1 | 5/2014 | Yang et al. |
| 2014/0162131 A1 | 6/2014 | Friend et al. |
| 2014/0170303 A1 | 6/2014 | Rayner et al. |
| 2014/0193711 A1 | 7/2014 | Biswal et al. |
| 2014/0235884 A1 | 8/2014 | Veinot et al. |
| 2014/0246398 A1 | 9/2014 | Zaghib et al. |
| 2014/0302396 A1 | 10/2014 | Lu et al. |
| 2014/0349183 A1 | 11/2014 | Macklin et al. |
| 2015/0044571 A1 | 2/2015 | Abdelsalam et al. |
| 2015/0079472 A1* | 3/2015 | Lin .............. H01M 4/134 429/220 |
| 2015/0086870 A1 | 3/2015 | Fukasawa et al. |
| 2015/0104705 A1 | 4/2015 | Canham et al. |
| 2015/0221936 A1 | 8/2015 | Huang |
| 2015/0280221 A1 | 10/2015 | Abdelsalam et al. |
| 2015/0303456 A1 | 10/2015 | Yoo et al. |
| 2016/0126538 A1 | 5/2016 | Hanelt et al. |
| 2016/0172670 A1 | 6/2016 | Friend |
| 2016/0197342 A1 | 7/2016 | Lee et al. |
| 2016/0308205 A1 | 10/2016 | Canham et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0047581 A1 | 2/2017 | Lu et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0119826 A1 | 4/2019 | Friend et al. |
| 2019/0148718 A1 | 5/2019 | Hatazawa et al. |
| 2019/0190020 A1 | 6/2019 | Park et al. |
| 2019/0198869 A1 | 6/2019 | Park et al. |

FOREIGN PATENT DOCUMENTS

| | | |
|---|---|---|
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 103 165 870 A | 6/2013 |
| CN | 103 633 295 A | 3/2014 |
| CN | 103840140 A | 6/2014 |
| CN | 104103807 A | 10/2014 |
| CN | 105742611 A | 7/2016 |
| EP | 0281115 A2 | 9/1988 |
| EP | 1054462 A1 | 11/2000 |
| EP | 1335438 A1 | 8/2003 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2533331 B1 | 8/2015 |
| EP | 2966037 A1 | 1/2016 |
| EP | 3093910 A1 | 11/2016 |
| GB | 980513 A | 1/1965 |
| GB | 2000191 A | 1/1979 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2001-266866 A | 9/2001 |
| JP | 2002-151055 A | 5/2002 |
| JP | 2003-077463 A | 3/2003 |
| JP | 2003-303586 A | 10/2003 |
| JP | 2004-185984 A | 7/2004 |
| JP | 2004/214054 A | 7/2004 |
| JP | 2004281317 A | 10/2004 |
| JP | 2005-63955 A | 3/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-042285 A | 2/2007 |
| JP | 2007-294423 A | 11/2007 |
| JP | 2007-335283 A | 12/2007 |
| JP | 2007318057 A | 12/2007 |
| JP | 2007335198 A | 12/2007 |
| JP | 2008-004460 A | 1/2008 |
| JP | 2008-166013 A | 7/2008 |
| JP | 2008186732 A | 8/2008 |
| JP | 2008-293872 A | 12/2008 |
| JP | 2008305746 A | 12/2008 |
| JP | 2010-080196 A | 4/2010 |
| JP | 2010-218848 A | 9/2010 |
| JP | 2010205609 A | 9/2010 |
| JP | 2011-009228 A | 1/2011 |
| JP | 2011-142021 A | 7/2011 |

(56) References Cited

FOREIGN PATENT DOCUMENTS

| | | |
|---|---|---|
| JP | 2011-192629 A | 9/2011 |
| JP | 2011/198614 A | 10/2011 |
| JP | 2012-009457 A | 1/2012 |
| JP | 2012-033317 A | 2/2012 |
| JP | 2012084521 A | 4/2012 |
| JP | 2012084522 A | 4/2012 |
| JP | 2012-178269 A | 9/2012 |
| JP | 2013/008585 A | 1/2013 |
| KR | 10-2003-0028241 | 4/2003 |
| KR | 2008-0091883 A | 10/2008 |
| KR | 10-2011-0072917 A | 6/2011 |
| KR | 10-2011-0116585 | 10/2011 |
| KR | 2012-0089512 A | 8/2012 |
| KR | 2012-0093756 A | 8/2012 |
| KR | 2012-0120034 A | 11/2012 |
| KR | 2013 0107892 A | 10/2013 |
| KR | 2013-0139554 A | 12/2013 |
| KR | 10-2014-0012351 | 2/2014 |
| KR | 10-2014-0022679 | 2/2014 |
| KR | 20140070227 A | 6/2014 |
| WO | WO-97/01193 A1 | 1/1997 |
| WO | WO-2004/049473 A2 | 6/2004 |
| WO | WO-2004/086539 A1 | 10/2004 |
| WO | WO-2005/075048 A1 | 8/2005 |
| WO | WO-2005/096414 A2 | 10/2005 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/028858 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2014/068318 A1 | 5/2014 |
| WO | WO-2015/003996 A1 | 1/2015 |
| WO | WO-2015/041450 A1 | 3/2015 |
| WO | WO-2015/082920 A1 | 6/2015 |
| WO | WO-2015/157358 A1 | 10/2015 |
| WO | WO-2016/102098 A1 | 6/2016 |
| WO | WO-2016/102208 A1 | 6/2016 |
| WO | WO-2016/174023 A1 | 11/2016 |

OTHER PUBLICATIONS

International Search Report dated Jul. 13, 2015 for PCT/KR2015/004029.
Abel, P. R. et al., Improving the Stability of Nanostructured Silicon Thin Film Lithium-Ion Battery Anodes through Their Controlled Oxidation, ACS Nano, 6(3):2506-2516, (2012).
Bang, B.M. et al., Scalable Approach to Multi-Dimensional Bulk Si Anodes via Metal-Assisted Chemical Etching, Energy & Environmental Science, 4:5013-5019 (2011).
Chartier, C. et al., Metal-assisted chemical etching of silicon in HF-H2O2, Electrochimica Acta, 53(17):5509-5516 (2008).
Chen et al., Mesoporous Silicon Anodes Prepared by Magnesiothermic Reduction for Lithium Ion Batteries, Journal of the Electrochemical Society, 158(9):A1055-A1059 (2011).
Chen, X. et al., A Patterned 3D Silicon Anode Fabricated by Electrodeposition on a Virus-Structured Current Collector, Advanced Function Materials, 21:380-387 (2011).
Choi et al., Silica nanofibres from electrospinning/sol-gel process, J. Mater. Sci. Letters, 22:891-893 (2003).
Cui, et al. Doping and Electrical Transport in Silicon Nanowires, Journal of Physical Chemistry, 104(22):5213-5216 (2000).
Cullis et al., Structural and Luminescence properties of porous silicon, Applied Physics Reviews, 82(3):909-965 (1997).
Gao et al., Alloy formation in Nanostructured Silicon, Journal of Advanced Materials, 13(11):816-819 (2001).
Gao, B, Synthesis and Electrochemical Properties of Carbon Nanotubes and Silicon Nanowires, Ph.D. Thesis in Applied and Material Sciences, University of North Carolina Chapel Hill (2001).
Graetz, J. et al., Highly reversible lithium storage in nanostructured silicon, Journal of the Electrochemical Society, 6(9):194-197 (2003).
Hatchard, T. D. and Dahn, J. R., In Situ XRD and Electrochemical Study of the Reaction.Of Lithium with Amorphous Silicon, Journal of the Electrochemical Society, 151(6):A838-A842 (2004).
Huang, Z. et al., Metal-Assisted Chemical Etching of Silicon: A Review, Adv. Mater. 23:285-308 (2011).
Jia et al., Novel Three-Dimensional Mesoporous Silicon for High Power Litium-Ion Battery Anode Material, Advs. Energy Mater., 1:1036-1039 (2011).
Jia et al., Supporting Information for Advs. Energy Mater., DOI: 10.1002/aenm.201100485: Novel Three-Dimensional Mesoporous Silicon for High Power Lithium-Ion Battery Anode Material, Advanced Energy Materials, DOI: 10.1002/aenm.201100485, 4 pages, (2011).
Jung, K. H. et al., Developments in Luminescent Porous Si, J. Electrochem. Soc., 140(10):3046-3064 (1993).
Jung, S. C. et al., Anisotropic vol. Expansion of Crystalline Silicon during Electrochemical Lithium Insertion: An Atomic Level Rationale, Nano Letters, 12:5342-5347, (2012).
Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).
Kuriyama, K. et al., Anomalous electrical resistivity and photovoltaic phenomenon in the fast mixed conductor lithium silicide Li12Si17, Physical Review, 38(18):1436-38 (1988).
Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).
Li, H. et al., The crystal structural evolution of nano-Si anode caused by lithium insertion and extraction at room temperature, Solid State Ionics 135:181-191 (2000).
Ma et al., Silver nanoparticles decorated, flexible $SiO_2$ nanofibers with long-term antibacterial effect as reusable wound cover, Colloids and Surfaces A: Physicochem. Eng. Aspects 387:57-64 (2011).
Mallet, J. et al., Growth of silicon nanowires of controlled diameters by electrodeposition in ionic liquid at room temperature, Nanoletters, 8(10):3468-3474 (2008).
Meijer, J.A. et al., Electrical resistivity and 7Li Knight shift of liquid Li—Si alloys, J. Phys. Condens. Matter I, 5283-5289 (1989).
Merriam Webster, Definition of Particle, 1 page.
Morales, Alfredo M. and Lieber, Charles M., A Laser Ablation Method for the Synthesis of Crystalline Semiconductor Nanowires, Science, 279(9):208-211 (1998).
Ohara, S. et al., A thin film silicon anode for Li-ion batteries having a very large specific capacity and long cycle life, Journal of Power Sources, (136):303-306 (2004).
Oudenhoven, Jos F. M. et al., All-solid-State Lithium-Ion Microbatteries: A Review of Various Three-Dimensional Concepts, Adv. Energy Mater. 1:10-33 (2011).

(56) References Cited

OTHER PUBLICATIONS

Park, M. H. et al., Silicon Nanotube Battery Anodes, Nano Letters, 9(11):3844-3847 (2009).

Purkid et al., Synthesis and Characterization of $SiO_2$ Nanowires Prepared from Rice Husk Ash, J. Metals, Materials and Minerals, 19(2):33-37 (2009).

Ren, W. et al., Preparation of porous silicon/carbon microspheres as high performance anode materials for lithium ion batteries, Journal of Materials Chemistry A: Materials for Energy and Sustainability, 3(11):5859-5865 (2015).

Richman et al., Ordered Mesoporous Silicon through Magensium Reduction of Polymer Templated Silica Thin Films, Nano Lett., 8(9):3075-3079 (2008).

Robinson, D. and Walsh, F.C., The Performance of a 500 Amp Rotating Cylinder Electrode Reactor. Part 1: Current-Potential Data and Single Pass Studies, Hydrometallurgy, 26:93 (1991).

Rongguan, L. et al., Electrodeposited porous-microspheres Li—Si films as negative electrodes in lithium-ion batteries, Journal of Power Sources, 196(8):3868-3873 (2011).

Schmuck, M. et al, Alloying of electrodeposited silicon with lithium—a principal study of applicability as a node material for lithium ion batteries, J. Solid State Electrochem, 14:2203-2207 (2010).

Shih, S. et al., Transmission electron microscopy study of chemically etched porous Si, Applied Physical Letters, 62(5):467-69 (1993).

Shin, H. C. et al., Nanoporous Structures Prepared by an Electrochemical Deposition Process, Advanced Materials, 15:19, 1610-1614 (2003).

Sinha, S. et al., Synthesis of Silicon Nanowires and Novel Nano-Dendrite Structures, CP544 Electronic Properties of Novel Materials Molecular Nanostructures, 431-436 (2000).

Sinha, S. et al., Synthesis of silicon nanowires and novel nanodendrite structures, Journal of Nanoparticle Research 6: 421-425 (2004).

Stoemenos, J. et al., Silicon on Insulator Obtained by High Dose Oxygen Implantation, Microstructure, and Formation Mechanism, J. Electrochem. Soc., 142(4):1248-1260, (1995).

Su, L. et al., Core Double-shell $Si@Si_2@C$ nanocomposites as anode materials for Li-ion batteries, Chemical Communication, 46:2590-2592 (2010).

Tarascon, J M. et al., An update of the Li metal-free rechargeable battery based on $Li_{1+x}Mn_2O_4$ cathodes and carbon anodes, Journal of Power Sources, 43-44:689-700 (1993).

Teschke, O. et al., Test cell simulating the operating conditions of water electrolysers for the evaluation of gas evolving electrocatalysts, Journal of Applied Electrochemistry, 13(3):371-376 (1983).

Van Schalkwijk, Walter A. and Scrosati, Bruno, Advances in Lithium-Ion Batteries.(edited 2002 Excerpts).

Wachtler, M. et al., Anodic materials for rechargeable Li-batteries, Journal of Power Sources 105:151-160 (2002).

Wakihara, M., Recent development in lithium ion batteries, Materials Science and Engineering, R33:109-134 (2001).

Webb, P.A. and Orr, C., Modern Methods of Particle Characterization, Micromeritics, 17 pages (1998).

Winter, M. et al., Insertion Electrode Materials for Rechargeable Lithium Batteries, Adv. Mater. 10(10):725-763 (1988).

Winter, Martin and Brodd, Ralph J., Batteries versus Fuel Cells versus Electrochemical Capacitors, Chem. Rev. 104:4245-4269 (2004).

Xiao, et al., Stabilization of Silicon Anode for Li-ion Batteries, Journal of the Electrochemical Society, 157(10):1047-1051 (2010).

Xu, R. et al., Comparison of sizing small particles using different technologies, Powder Technology, 132:145-153, (2003).

Yang, J. et al., Si/c composites for high capacity lithium storage materials, Journal of the Electrochemical Society, 6(8):154-156 (2003).

Yu et al., Reversible Storage of Lithium in Silver-Coated Three-Dimensional Macroporous Silicon, Adv. Mater., 22:2247-2250 (2010).

Zhang et al., Vapor-induced solid-liquid-solid process for silicon-based nanowire growth, Journal of Power Sources 195:1691-1697 (2010).

Zhang, Sheng Shui, A review on electrolyte additives for lithium-ion batteries, Journal of Power Sources, 162:1379-1394 (2006).

Zhou, G. W. et al., Controlled Li doping of Si nanowires by electrochemical insertion methods, Applied Physics Letters, 75(16):2447-2449 (1999).

* cited by examiner step A step B step C

NEGATIVE ELECTRODE ACTIVE MATERIAL AND LITHIUM SECONDARY BATTERY COMPRISING SAME

This application claims the priority of Korean Patent Application No. 10-2014-0048385, filed on Apr. 22, 2014 in the KIPO (Korean Intellectual Property Office), the disclosure of which is incorporated herein entirely by reference. Further, this application is the National Stage application of International Application No. PCT/KR2015/004029, filed Apr. 22, 2015, which designates the United States and was published in Korean. Each of these applications is hereby incorporated by reference in their entirety into the present application.

TECHNICAL FIELD

The present invention relates to a secondary battery technology, and more particularly, to a negative active material and a lithium secondary battery including the negative active material.

BACKGROUND ART

Secondary batteries are rechargeable and dischargeable by using an electrode material having excellent reversibility, and lithium secondary batteries have been commercialized representatively. Lithium secondary batteries are expected to be provided in moveable units such as vehicles or to be applied as medium and large sized power source used in a power storage of a power supply network such as a smart grid, as well as small sized power source of small information technology (IT) appliances such as smart phones, portable computers, and electronic paper.

When lithium metal is used as n negative material of a lithium secondary battery, dendrites may be formed, and thereby causing shorting of the battery or a risk of explosion. Thus, instead of using the lithium metal, crystalline carbon such as graphite and artificial graphite or carbon based active material such as soft carbon or hard carbon capable of intercalating and deintercalating lithium ions has been mainly used as a negative. However, as applications of secondary batteries have increased, demands for secondary batteries having high capacity and high output have increased more, and accordingly, non-carbon based negative materials capable of generating an alloy with lithium, for example, silicon (Si), tin (Sn), or aluminum (Al) having a capacity of 500 mAh/g or greater that may replace the carbon based negative material having a theoretical capacity of 372 mAh/g, have drawn attention.

Among the above non-carbon based negative materials, silicon has a theoretical capacity of about 4200 mAh/g that is the largest among those materials, and thus, applications of silicon are considered to be important in view of capacity. However, since silicon expands about four times greater in volume during a charging operation than during a discharging operation, an electric connection between active materials may break or an active material may be isolated from a current collector due to a volume variation during charging and discharging processes, and an irreversible reaction such as forming of a solid electrolyte interface (SEI) layer such as $Li_2O$ may occur and lifespan may degrade because of an erosion of the active material due to an electrolyte. Therefore, there is a barrier in commercializing the silicon as the negative material.

There have been suggested many kinds of techniques for implementing a battery having a relatively high capacity, while minimizing expansion and contraction in a volume of an active material and improving lifespan, and among those, an active material obtained by generating nanosilicon by using $SiO_x$ as a matrix is highly possible to be commercialized. An active material using $SiO_x$ material as a matrix has lifespan and capacity that have been improved to some degree, but there are actual limitations in using the above active material because of a large irreversible capacity of $SiO_x$. As another approach, there is provided a method of generating nano-sized silicon particles. However, even nano-sized silicon particles have not reached a level of practical use yet, due to damage to particles caused by volume expansion/contraction and rapid degradation of lifespan even though a degree of expansion/contraction is smaller. In addition, reduced size of silicon particles results in reduction in capacity, and thus, there is a limitation in using the silicon particles. Therefore, in order to commercialize the silicon material, it is necessary to restrain the volume variation during the charging and discharging and to maximize a capacity of a battery.

DISCLOSURE OF THE INVENTION

Technical Problem

The present invention provides a negative active material capable of improving an irreversible capacity and reducing a volume variation during charging and discharging to have a high energy density, high capacity, and longer lifespan, by using silicon.

The present invention provides a secondary battery using the negative active material having the above advantages.

Technical Solution

According to an aspect of the present invention, there is provided a negative active material for a secondary battery, the negative active material comprising silicon particles, wherein circularities of the particles are determined by equation 1 below, and the circularities are 0.5 or greater and 0.9 or less, $$\text{Circularity} = 2(pi \times A)^{1/2}/P \qquad \text{[Equation 1]}$$

where A denotes a projected area of the silicon particle that is two-dimensionally projected, and P denotes a circumferential length of the silicon particle that is two-dimensionally projected.

The circularities of the silicon particles may be 0.6 or greater and 0.8 or less. The silicon particles may include solid type, fiber type, or tubular type silicon particles.

In some embodiments, an area of a (110) surface of each of the silicon particles may be greater than an area of a (100) surface and an area of a (111) surface. The (110) surface of the silicon particle may be a fractured surface or a polished surface.

In one embodiment, an average diameter of the silicon particles may range from 30 nm to 300 nm. The silicon particles may have a purity of 99% or greater.

The negative active material may further include a silicon oxide layer formed on the silicon particles. The negative active material may further include a silicon carbide layer on the silicon oxide layer. In another embodiment, the negative active material may further include a conductive layer formed on the silicon particles. In this case, the conductive layer may include an amorphous carbon layer or conductive metal oxide particles.

According to an aspect of the inventive concept, there is provided a lithium secondary battery including the above negative active material.

Advantageous Effects

Embodiments of the present invention provide a silicon negative active material and a lithium secondary battery. According to the embodiments of the present invention, silicon particles are adjusted to have circularities of 0.5 to 0.9 so as to suppress or reduce tensile hoop stress applied to lithiated silicon during charging a battery, and thus, an irreversible reaction caused from crack and/or fracture due to a volume variation of the silicon particles may be restrained. Accordingly, lifespan and capacity of the battery may be improved.

MODE FOR CARRYING OUT THE INVENTION

Figure 1A:
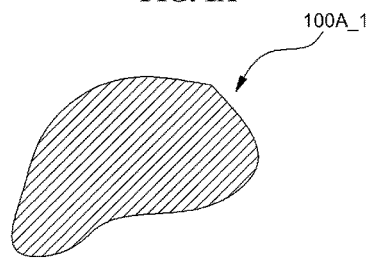
FIGS. 1A and 1B are cross-sectional views respectively showing shapes of silicon particles having circularities according to various embodiments of the inventive concept.

Hereinafter, preferred embodiments of the inventive concept will be described in detail with reference to accompanying drawings.

Embodiments of the inventive concept will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art.

In the drawings, lengths and sizes of layers and regions may be exaggerated for convenience of description and clarity, and like reference numerals in the drawings denote like elements. As used herein, the term "and/or" includes any and all combinations of one or more of the associated listed items.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "comprise" and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It has been known that rapid degradation of lifespan and increase in an irreversible capacity while a silicon particle is applied to a secondary battery negative is caused by large expansion and contraction in a volume of the silicon particle. A reaction between lithium ions and silicon particles for generating a $Li_xSi$ alloy due to an electrochemical reaction starts from surfaces of the silicon particles. In this case, a sharp boundary exists at an interface between inside of silicon (pristine-Si) that has not reacted yet and a lithium alloy layer $Li_xSi$. As lithiation proceeds, the lithium alloy layer becomes greater, and finally, the entire silicon particle is converted to $Li_xSi$ alloy and then the electrochemical reaction finishes. During the lithiation process, inside of the silicon that has not reacted and the lithium alloy layer co-exist, and from the moment when the lithium alloy layer surrounds the silicon particle therein, tensile hoop stress is applied to the lithium alloy layer. It is also known that the tensile hoop stress is a main cause of crack and fracture in a surface of the silicon particle.

However, the present inventors have derived the present inventive concept that is capable of preventing surface crack of silicon particles by preventing or reducing the tensile hoop stress applied to the surface during the lithiation process, based on a factor that crack or damage to the surface of the silicon particle rarely occurs even if compression stress 10 times or more greater than the tensile hoop stress is applied because the compression stress is more intensive than the tensile stress.

According to embodiments of the present invention, the tensile hoop stress may be suppressed or reduced by controlling a circularity of the silicon particle, and thus, crack caused by volume expansion during the lithiation process and irreversible lifespan degradation may be effectively improved. Embodiments below are related to a lithium secondary battery using silicon particles as a negative active material, wherein a capacity and lifespan of the lithium secondary battery may be improved by controlling shapes of the silicon particles, and a secondary battery using thereof.

Figure 1B:
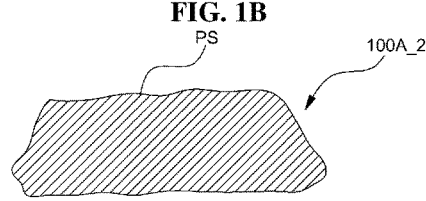
Figure 2:
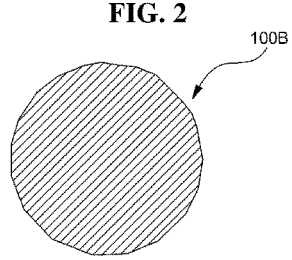
FIG. 2 is a cross-sectional view showing a shape of a spherical silicon particle according to a comparative example.

FIGS. 1A and 1B are cross-sectional views respectively showing silicon particles 100A_1 and 100A_2 having circularities according to various embodiments, and FIG. 2 is a cross-sectional view of a spherical silicon particle 100B according to a comparative example.

The silicon particles according to the embodiment of the present invention have irregular shapes such as a potato type (100A_1) as shown in FIG. 1A or a flake type having a planarized surface PS as shown in FIG. 1B. The silicon particles 100A_1 and 100A_2 having the above irregular shapes may be collectively used as a negative active material of a lithium secondary battery. Regarding the silicon particles 100A_1 and 100A_2 having the irregular shapes, FIGS. 1A and 1B exemplarily show solid type particles of kernel shapes, but the silicon particles according to the embodiment of the present invention may include silicon particles of three-dimensional irregular shapes, which do not have radial shape that is symmetric in an axial direction in a hollow type tubular structure or fiber structure.

The silicon particles may be polysilicon or single crystalline silicon, and moreover, may have a low degree of crystallization or may be amorphous. In addition, the silicon particles may include a compound of the silicon and one, two, or more metals selected from the group consisting of tin (Sn), antimony (Sb), zinc (Zn), germanium (Ge), aluminium (Al), copper (Cu), bismuth (Bi), cadmium (Cd), magnesium (Mg), arsenic (As), gallium (Ga), lead (Pb), and iron (Fe), as well as the silicon particles having a purity of 99% or greater capable of maximizing capacity.

The planarized surface PS of the silicon particle 100A_2 may be a dominant surface in entire external surfaces of the silicon particle 100A_2, and the dominant surface may be a {110} surface. Quantitatively, an area of the (110) surface of the silicon particle 100A_2 may be greater than that of another (100) surface and a (111) surface.

A degree how much the silicon particles 100A_1 and 100A_2 are different from spherical shape may be evaluated based on a circularity expressed by Equation 1 below. The circularity is determined as a ratio of a projected area of the particle with respect to a circumferential length of the particle. In a case of the solid type, the circularity may be measured by using a longest length of the particle and a projected area of a cross-section of the particle including the longest length. In a case of the hollow type tubular structure or fiber structure, the circularity may be measured by using a projected area of a cross-section perpendicular to an extension direction of the tube or fiber, that is, longer axis direction.

$$\text{Circularity} = 2(pi \times A)^{1/2}/P \qquad \text{[Equation 1]}$$

Here, A denotes a projected area of a silicon particle that is two-dimensionally projected, and P denotes a circumferential length of the silicon particle that is two-dimensionally projected. The circularity of silicon particles may be measured from an image obtained by a scanning electron microscope by using commercialized software, e.g., ImageJ®, for example, Imagej136. Otherwise, the circularity may be measured by a flow particle image analyser, e.g., FPIA-3000® of SYSMEX, Inc. (Kobe, Japan)

An average grain size of the silicon particles 100A_1 and 100A_2 may range from 30 nm to 300 nm, and more preferably, from 30 nm to 200 nm. When the average grain size of the silicon particles 100A_1 and 100A_2 is less than 30 nm, a relative ratio of a conductive layer or a conductive material of particle type in an active material slurry becomes greater, and thus, a capacity of a battery is decreased. Also, when the average grain size of the particles exceeds 300 nm, the circularity may be increased in order to minimize surface energy or may not be easily adjusted.

The silicon active material particle 100B that is nearly a complete sphere according to the comparative example of FIG. 2 has a circularity that is substantially 1. On the contrary, the circularity of the silicon particles 100A_1 and 100A_2 according to the embodiment of the present invention as shown in FIGS. 1A and 1B ranges from 0.5 to 0.9, and more preferably, from 0.6 to 0.8. The particles having the circularity less than 0.5 may be pulverized from edges that are thin, due to a multiple times of charging and discharging operations, and lifespan thereof may deteriorate. On the other hand, when the circularity exceeds 0.9, crack or fracture is likely to occur due to the tensile stress applied to a lithiated layer, as will be described later. Forming of a solid electrolyte interface (SEI) layer in an internal surface of the silicon particle, which is exposed due to the crack or fracture, is accelerated, and thus lifespan of the battery deteriorates. According to the embodiment of the present invention, pulverization of the silicon particles may be prevented even when the average diameter is within a sub-micron range, e.g., 30 nm to 300 nm, and forming of the SEI may be prevented. Therefore, deterioration of lifespan caused by the volume variation according to the charging and discharging operations may be prevented.

Figure 3A:
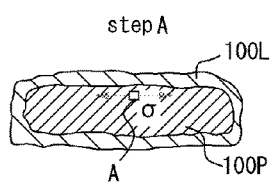
FIGS. 3A to 3C illustrate growth steps of a lithiated layer, which a silicon particle having a dominant planarized surface experiences as being lithiated during a charging operation.
Figure 3B:
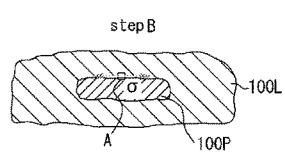
Figure 3C:
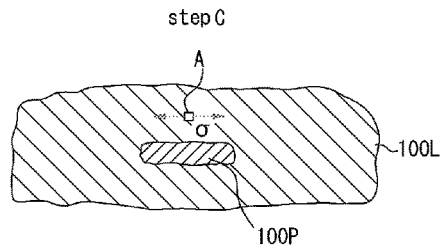
Figure 3D:
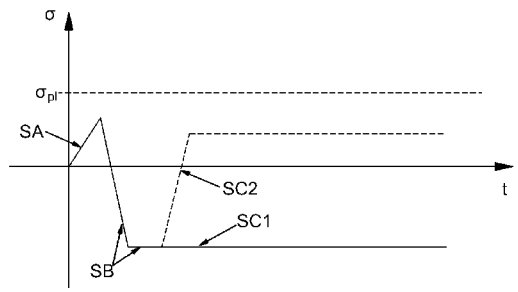
FIG. 3D is a graph showing a stress variation during the growing steps.
Figure 3E:
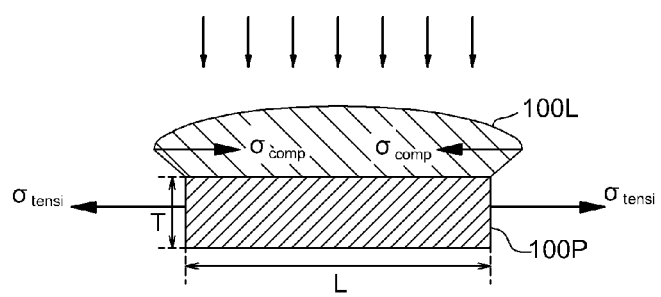
FIG. 3E is a schematic diagram of a hypothetic stress distribution for qualitatively illustrating the above graphs.

FIGS. 3A to 3C illustrate growth steps of a lithiated layer, which a silicon particle having a dominant planarized surface experiences as being lithiated during a charging operation, according to an embodiment of the present invention, FIG. 3D is a graph illustrating stress variation in corresponding growth steps, and FIG. 3E is a schematic diagram of a hypothetical stress distribution for illustrating the above graph qualitatively. A transverse axis of the graph denotes a charging time in which lithium intercalation occurs, and a longitudinal axis denotes stress.

Referring to FIGS. 3A to 3C, regarding a step A, in which lithiation starts on the surface of the silicon particle having the planarized surface (see PS of FIG. 1B) of the circularity from 0.5 to 0.9 according to the embodiment of the present invention, a representative stress element M located in a silicon core 100P that is not lithiated yet experiences small tensile stress due to expanding lithiated layer 100L. As the lithiation progresses to a step B, compression stress is applied to the representative stress element M located at a front end of lithiation moving toward the silicon core 100P. However, even the lithiation goes to a step C, the compression stress is still applied to the representative stress element M located in the lithiation layer 100L, where the corresponding region is a region at which the lithiated layer 100L still experiences an elastic behavior with respect to the compression stress. Therefore, no crack or fracture occurs in the lithiated layer.

Referring to FIG. 3D, change in the dominant stress in the silicon particles shown in the graph includes tensile stress SA in the step A and compression stress SB in the step B. In the step C where the lithiated layer 100L is dominant, compression stress SC1 consecutively or subtle tensile stress SC2 is applied.

Referring to FIG. 3E, regarding the step C, if the core 100P of the active material particle having a ratio (LIT) between a length L of a projected area and a thickness T of about 4.28 and a circularity of about 0.7, that is, within a range between equal to or greater than 0.5 and less than or equal to 0.9, has the lithiated layer 100L formed on a flat surface and an interface of a flat structure (linear), compression stress $\sigma_{comp}$ is applied to a surface of the lithiated layer 100L configuring the surface of the silicon particle. Under the compression stress $\sigma_{comp}$, the lithiated layer 100L is a region experiencing an elastic behavior, and thus no crack or fracture occurs in the lithiated layer 100L. Although FIG. 3E hypothetically illustrates transferring of lithium ions Li+ in one direction, even if lithium ions Li+ are omni-directionally transferred to a surface of a silicon particle and the lithiated layer 100L grows as a shell, magnitude of tensile hoop stress applied to the shell may be reduced or eliminated throughout the entire shell due to the compression stress $\sigma_{comp}$ due to the interface between flat surface elements based on a controlled circularity. Therefore, formation of crack on a surface of the lithiated layer 100L may be suppressed.

Figure 4A:
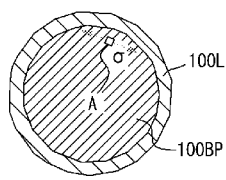
FIGS. 4A to 4C are diagrams showing steps of growing a lithiated layer that a spherical silicon particle according to a comparative example experiences as being lithiated during a charging operation.
Figure 4B:
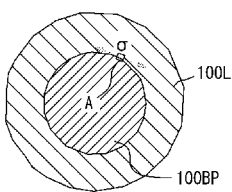
Figure 4C:
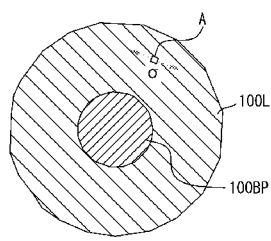
Figure 4D:
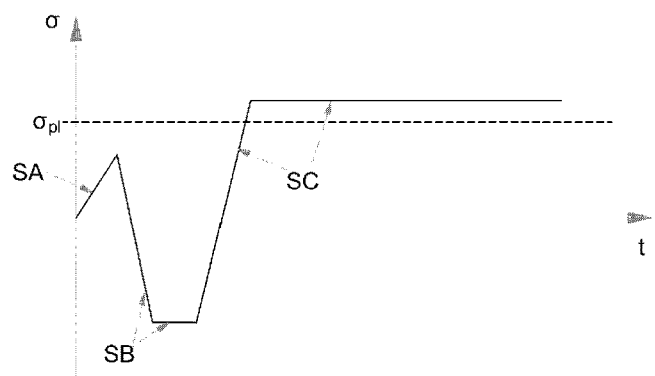
FIG. 4D is a graph of a stress variation during the corresponding growing steps.

FIGS. 4A to 4C are diagrams showing growth steps of a lithiated layer that a silicon particle of a spherical shape according to a comparative embodiment as being lithiated during a charging operation, and FIG. 4D is a graph of a stress variation in corresponding growth steps. A transverse axis of the graph denotes a charging time in which lithium intercalation occurs, and a longitudinal axis denotes stress.

Referring to FIGS. 4A to 4C and 4D, in a step A where lithiation begins on a surface of the silicon particle, the circularity of which is substantially 1, according to the comparative embodiment, a representative stress element M located in a silicon core 100BP that is not yet lithiated experiences small tensile stress due to the expanding lithiated layer 100L like in the silicon particle having the circularity according to the embodiment of the present invention. Also, as lithiation progresses as in a step B, compression stress is applied to the representative stress element M located at a front edge of lithiation moving toward the silicon core 100BP. However, in a step C, as elastic deformation is gradually removed at the representative stress element M located in the lithiated layer 100L, the lithiated layer 100L dominantly grows in a radial shape (or, in radial directions), thereby inducing hoop stress of tensile stress equal to or greater than critical tensile stress $\sigma_{plastic}$. Accordingly, a surface of the lithiated layer 100L weakened due to volume expansion is cracked or fractured.

Development profile of the stress shown in FIG. 4D may be equivalently shown in a fiber shape having a three-dimensional symmetric radial shape or a three-dimensional tube, as well as in the silicon particle having substantially spherical shape provided exemplarily. The above description about the stress variation depending on the lithiation is simply provided as a theoretical basis, and the inventive concept is not limited to the above theory.

It is identified that volume expansion during the lithiation of the silicon particle is performed anisotropically. In detail, volume expansion of silicon in the <110> direction is dominantly shown during the lithiation, and volume expansion in the <111> direction is small enough to be ignorable. Although there is no specific theory for that, it is estimated that spreading path of lithium is related to variation of morphology depending on elasto-plastic deformation of silicon due to the lithiation.

According to the above experimental results, the volume expansion occurs more in a direction in which the lithium is rapidly spread, and it is desirable that the dominant planarized surface of the silicon particle is the (110) surface as a method of minimizing tensile hoop stress in the expanding lithiated layer. Quantatively, an area of the (110) surface of the silicon particle may be greater than that of another (110) surface and that of the (111) surface. Controlling of a crystallization surface on the surface of the silicon particle may be adjusted by physical etching such as milling, chemical etching such as removal of oxide after oxidation, or a combination thereof, or may be adjusted according to a method of forming silicon particles, e.g., electric explosion, milling, or fracturing, based on well-known arts.

According to the embodiment, the silicon particles are manufactured to have a reduced circularity, e.g., 0.5 to 0.9, and thus, irreversible reactions caused by crack or fracturing of the silicon particles during the charging operation of a battery may be suppressed or reduced. Also, as the circularity of the silicon particle becomes closer to 1, silicon particles are actually in point-contact with one another. As a result, electronic conductivity between the silicon particles degrades, and thus, an output voltage may be reduced due to an increase in an internal resistance of the battery. However, according to the embodiment of the inventive concept, the silicon particles may be in surface-contact with one another, it may be expected to increase an output of the battery due to reduction in the internal resistance.

Figure 5A:
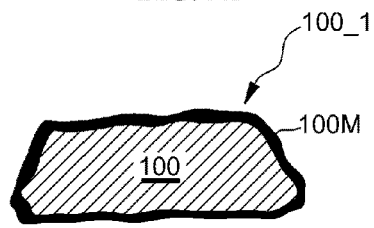
FIGS. 5A to 5C are cross-sectional views showing silicon negative active materials according to various embodiments of the inventive concept.
Figure 5B:
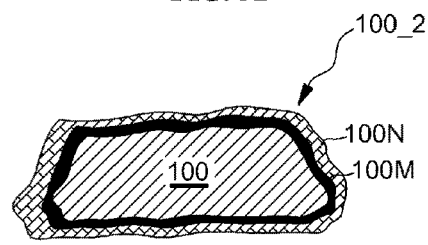
Figure 5C:
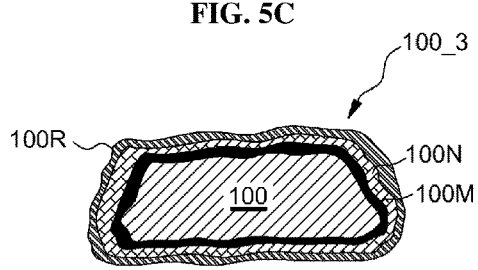

FIGS. 5A to 5C are cross-sectional views showing structures of silicon negative active materials according to various embodiments of the present invention.

Referring to FIG. 5A, a silicon negative active material 100_1 may include a core 100C of a silicon particle and a shell 100M of silicon oxide surrounding the core 100C. The core 100C of the silicon particle may be single-crystalline, polycrystalline, or may be amorphous. In another embodiment, the core 100C of the silicon particle may include closed pores therein.

Referring to FIG. 5B, in another embodiment, a silicon negative active material 100_2 may further include a silicon carbide layer 100N on the shell 100M of silicon oxide. The shell 100M of silicon oxide or a dual shell (100M and 100N) including silicon oxide and silicon carbide may function as a clamping layer for restraining volume expansion caused by lithiation of the core 100C of the silicon particle, and thus, lifespan of a battery may increase. However, since the silicon oxide and silicon carbide have a less capacity than that of silicon, and thus may have an appropriate thickness within a range in which energy density is not decreased. In one embodiment, the thickness of the silicon oxide and the silicon carbide may range from 0.5 nm to 20 nm.

The shell 100M of silicon oxide may include a native oxide layer, chemical silicon oxide that is artificially grown by using a solvent containing oxygen, e.g., alcohol, distilled water, or peroxide compound, or thermal oxide. The shell 100N of silicon carbide may be manufactured by dispersing silicon active material particles in a liquid organic compound including hydrocarbon, alcohol, ether, or ester compound, obtaining and drying the silicon active material particles again, and performing a thermal treatment at a high temperature ranging from 600° C. to 1300° C. The above preparation methods are examples, and the present invention is not limited thereto. For example, the shell of silicon carbide may be manufactured by coating an organic solid layer including synthetic or organic polymer that is a carbon precursor on intermediate particles by a high temperature spraying method or a misting method, and performing a thermal treatment after passing through an appropriate decompression or cooling process.

In some embodiments, as shown in FIG. 5C, a conductive layer 100R may be further formed at an outermost part of the silicon negative active material. The conductive material 100R may include a carbon-based conductive layer such as graphite, soft carbon, or graphene. The conductive layer 100R is provided for electrically connecting the silicon negative active materials in contact with each other, and reduces an internal resistance to a current collector (not shown).

In some embodiments, the carbon-based conductive layer may be crystalline or at least partially amorphous carbon layer. If the carbon-based conductive layer is highly crystalline, the carbon-based conductive layer may include graphite, but in this case, the graphite may react with electrolyte at a surface thereof. However, a low-crystalline or an amorphous carbon layer has a chemical corrosion resistance with respect to the electrolyte, decomposition of the electrolyte is restrained during charging and discharging, and thereby improving lifespan of a negative electrode. Also, the carbon-based conductive layer may have $SP_2$ graphite structure having conductivity and $SP_3$ diamond structure having an insulating property together. In order for the carbon-based conductive layer to have conductivity, $SP_2$ may have a mole fraction that is greater than that of $SP_3$, and the mole fraction may be adjusted through a thermal treatment process.

The above carbon-based conductive layer is an example, and the present invention is not limited thereto. For example, the outermost portion of the silicon composite active material 100_3 may include nano-scale particles of conductive metal oxide such as antimony tin oxide or antimony zinc oxide, or another conductive layer such as a layer of the nano-scale particles. Although not shown in FIG. 1B, the conductive layer 100R may be additionally provided on the silicon active material composite 100A_2.

Experimental Example

Figure 6:
FIG. 6 is a scanning electron microscope image of a silicon particle having a circularity of about 0.8.

Polysilicon coarse particles having an average diameter of about 5 μm are processed by a ball milling process, in which a magnitude and time of shearing stress are controlled, to manufacture silicon particles respectively having circularities of about 0.4, 0.5, 0.6, 0.7, 0.8, and 0.9, and silicon particles having circularity of 0.95 or greater are manufactured from a silicon precursor by using a liquid pyrolysis method. FIG. 6 is a scanning electron microscope image of a silicon particle having circularity of about 0.8. Analyzed purity of silicon in the silicon particles is 99% or greater. The above method is an example, and the silicon particles may be prepared by another polishing process, or by electrically exploding a bulk silicon material such as a silicon rod or a wafer. An average grain size of the silicon particles is about 220 nm.

Table 1 below illustrates an initial efficiency and a capacity retention rate of a half cell, after manufacturing a negative electrode by making the silicon particles having the respective circularities as a slurry. The capacity retention rate is measured after performing charging and discharging operations 50 times. An initial capacity that becomes a reference was 4,200 mAh/g, that is, a theoretical capacity of silicon

TABLE 1

| | Battery characteristics | | |
|---|---|---|---|
| Circularity | Initial efficiency | Weight specific capacity | Retention @ 50 times |
| 0.4 | 81% | 2040 mAh/g | 73% |
| 0.5 | 84% | 2110 mAh/g | 85% |
| 0.6 | 88% | 2290 mAh/g | 93% |
| 0.7 | 89% | 2320 mAh/g | 98% |
| 0.8 | 90% | 2341 mAh/g | 98% |
| 0.9 | 90% | 2343 mAh/g | 81% |
| 0.95 | 90% | 2342 mAh/g | 60% |

Referring to Table 1 above, when the circularity is equal to or less than 0.8, the initial efficiency is gradually reduced as the circularity decreases. However, when the circularity is 0.4 or greater, the initial efficiencies are all 80% or greater, that is, commercialization is possible. In view of the capacity retention, when the circularity is less than 0.5, a remaining capacity is decreased less than 80% due to an increase in irreversibility according to the volume expansion. However, in a case of the circularity in a range of 0.5 to 0.9, the remaining capacity maintains at 80% or greater that may be applied in practical use, and within a range of 0.6 to 0.8, the remaining capacity maintains at 90% or greater.

While the inventive concept has been particularly shown and described with reference to exemplary embodiments thereof, it will be understood that various changes in form and details may be made therein without departing from the spirit and scope of the following claims.

The invention claimed is:

1. A negative active material for a secondary battery, the negative active material comprising silicon particles,
    wherein an average diameter of the silicon particles is in a range from 30 nm to 300 nm, and
    wherein circularities of the silicon particles are determined by Equation 1 below, and the circularities are 0.5 or greater and 0.9 or less, $$\text{Circularity} = 2(pi \times A)^{1/2}/P \quad \text{[Equation 1]}$$

where A denotes a projected area of a silicon particle that is two-dimensionally projected, and P denotes a circumferential length of the silicon particle that is two-dimensionally projected.

2. The negative active material of claim 1, wherein the silicon particles comprise solid particles.

3. The negative active material of claim 1, wherein the circularities of the silicon particles are 0.6 or greater and 0.8 or less.

4. The negative active material of claim 1, wherein an area of a (110) surface of each of the silicon particles is greater than an area of a (100) surface and an area of a (111) surface.

5. The negative active material of claim 1, wherein the silicon particles comprise a silicon oxide layer formed as a shell on the silicon particles.

6. The negative active material of claim 5, wherein the silicon particles comprise a silicon carbide layer formed as a shell on the silicon oxide layer.

7. The negative active material of claim 5, wherein a thickness of the silicon oxide layer is in a range of 0.5 nm to 20 nm.

8. The negative active material of claim 5, wherein the silicon oxide layer is chemical silicon oxide that is artificially grown using a solvent comprising oxygen.

9. The negative active material of claim 8, wherein the solvent comprising oxygen is alcohol, distilled water, or a peroxide compound.

10. The negative active material of claim 1, further comprising a conductive layer formed on the silicon particles.

11. The negative active material of claim 10, wherein the conductive layer comprises an amorphous carbon layer or conductive metal oxide particles.

12. The negative active material of claim 1, wherein the silicon particles have a purity of 99% or greater.

13. A lithium secondary battery comprising the negative active material of claim 1.

14. The negative active material of claim 1, wherein the silicon particles have irregular shapes.

15. The negative active material of claim 1, wherein a dominant external surface of each of the silicon particles is a {110} surface.

* * * * *